US006937860B2

(12) United States Patent
Jahn

(10) Patent No.: US 6,937,860 B2
(45) Date of Patent: Aug. 30, 2005

(54) HANDOVER METHOD (ROAMING) FOR MOBILE TERMINAL DEVICES

(75) Inventor: Alfred Jahn, München (DE)

(73) Assignee: Siemens Aktiengesellschaft, Munich (DE)

( * ) Notice: Subject to any disclaimer, the term of this patent is extended or adjusted under 35 U.S.C. 154(b) by 720 days.

(21) Appl. No.: 09/725,343

(22) Filed: Nov. 29, 2000

(65) Prior Publication Data

US 2002/0137512 A1 Sep. 26, 2002

Related U.S. Application Data

(63) Continuation of application No. PCT/DE99/01372, filed on May 6, 1999.

(30) Foreign Application Priority Data

May 29, 1998  (DE) .......................................... 198 24 141

(51) Int. Cl.[7] ............................................... H04Q 7/20
(52) U.S. Cl. ....................... 455/436; 455/439; 455/445; 370/331
(58) Field of Search .............................. 455/435.1, 436, 455/439, 445, 560, 414.1, 415, 417, 428, 442, 517, 432.1; 370/331

(56) References Cited

U.S. PATENT DOCUMENTS

| 4,748,655 A |   | 5/1988  | Thrower et al. ......... 455/550.1 |
|-------------|---|---------|-----------------------------------|
| 5,509,053 A |   | 4/1996  | Gowda et al. .............. 455/445 |
| 5,566,356 A | * | 10/1996 | Taketsugu .................. 455/436 |
| 5,657,317 A | * | 8/1997  | Mahany et al. ............. 370/338 |
| 5,734,979 A | * | 3/1998  | Lu et al. ...................... 455/445 |
| 5,781,862 A | * | 7/1998  | Da Silva et al. ............. 455/436 |
| 5,797,096 A | * | 8/1998  | Lupien et al. ............... 455/433 |
| 5,812,949 A | * | 9/1998  | Taketsugu .................... 455/439 |
| 5,867,788 A | * | 2/1999  | Joensuu ....................... 455/445 |
| 5,949,776 A | * | 9/1999  | Mahany et al. ............. 370/338 |
| 6,192,231 B1 | * | 2/2001  | Chapman et al. ............ 455/401 |
| 6,473,411 B1 | * | 10/2002 | Kumaki et al. .............. 370/331 |
| 6,580,906 B2 | * | 6/2003  | Bilgic et al. .............. 455/422.1 |

FOREIGN PATENT DOCUMENTS

DE          197 05 794 C1      8/1998

OTHER PUBLICATIONS

"Cordless Telecommunications in Europe", Wally H. W. Tuttlebee (Ed.), Springer Verlag London, dated 1990, pp. 43–48 and 256–258, as mentioned on p. 4 of the specification.

* cited by examiner

*Primary Examiner*—Simon Nguyen
(74) *Attorney, Agent, or Firm*—Laurence A. Greenberg; Werner H. Stemer; Ralph E. Locher

(57) ABSTRACT

In the course of its logging on at a base station (B2) coupled to a switching device (V), a mobile terminal device (E1) transmits a terminal equipment identifier (EK1) identifying the mobile terminal device (E1) to the base station (B2). The base station (B2) thereupon transmits the terminal equipment identifier (EK1)—if appropriate together with a base station identifier (BK2) identifying the base station (B2)—to the switching device (V) and initiates the activation of a forwarding performance feature, e.g. for call diversion, known per se in connection with wire-based terminal equipment, in the switching device (V). As a result of the activation of this forwarding performance feature, a connection setup to be routed via the base station (B2) is initiated in the event of connection requests directed to the mobile terminal device (E1). As a result, a central radio switching assembly, as required in known handover methods, is unnecessary.

13 Claims, 2 Drawing Sheets

HANDOVER METHOD (ROAMING) FOR MOBILE TERMINAL DEVICES

CROSS-REFERENCE TO RELATED APPLICATION

This is a continuation of copending International Application PCT/DE99/01372, filed May 6, 1999, which designated the United States.

BACKGROUND OF THE INVENTION

Field of the Invention

In many communications systems, terminal devices which can be used for different purposes, such as e.g. for transmission of voice, video, fax, file, program and/or measurement data, are increasingly being coupled in a wire-free manner. A connection to mobile terminal devices of this type is usually set up via so-called base stations, which have to be coupled to the mobile terminal devices via an air interface. In many cases, the base stations are coupled to a switching device via which connections are switched to the mobile terminal devices. In this case, the switching device may be connected to an external communications network, as a result of which it is also possible to set up connections between the mobile terminal devices and external terminal devices.

The spatial region around a base station in which a wire-free connection to a mobile terminal device via the base station is possible with a specified quality is also referred to as a radio cell of the base station. In order to supply a relatively large region with connection possibilities, a plurality of base stations are generally distributed over the region to be supplied in such a way that their radio cells form a full-coverage or space-filling network.

Before a mobile terminal device can be reached via a base station or can itself set up a connection via the base station, the mobile terminal device must log on at the base station. Such logging-on is usually initiated by the exchange of radio signals between the mobile terminal device and the base station, which is triggered by a registration call of the mobile terminal device, and which is also referred to as a "location registration call". This is not bound to an existing connection or to a connection request, but rather can be effected in a standby state of the mobile terminal device, the state also being referred to as an "idle state".

As long as a mobile terminal device is logged on at a base station, this base station is responsible for a wire-free connection setup from or to the mobile terminal device. As a result of logging on, the communications system is configured in such a way that, in the event of a subsequent connection request directed to the mobile terminal device, a connection to the mobile terminal device is routed via the base station that is currently responsible for the mobile terminal device.

If a mobile terminal device which is logged on at a base station leaves the radio cell thereof and enters the radio cell of another base station, the mobile terminal device logs off from the first-mentioned base station, in order to log on at the other base station. The configuration of the communications system changes resulting, inter alia, in that a connection is now set up via the other base station in the event of a subsequent connection request directed to the mobile terminal device. The method for logging on a mobile terminal device or for handing over the responsibility for a mobile terminal device is often referred to as "roaming", and for connections to be set up, results in defining a route leading to the mobile terminal device via the base station that is currently responsible for the mobile terminal device.

In known methods, the forwarding of connection requests to mobile terminal devices is controlled by a central radio switching assembly which is generally provided as a supplementation of the switching device and functions as an interface between base stations and the switching device. To that end, information items regarding the mobile terminal devices that are in each case presently logged on at the base stations are communicated to the central radio switching assembly by the base stations connected thereto, on the basis of which the central radio switching assembly sets up requested connections to the mobile terminal devices via the respectively responsible base station. Configurations and methods of this type are disclosed for example in "Cordless Telecommunications in Europe" by Wally H. W. Tuttlebee (Ed.), Springer-Verlag London, 1990, pages 43 to 48 and 256 to 258.

Systems designed for wire-based communication are often used as switching devices. In these cases, the central radio switching assembly is driven, on the part of the switching device, like a group of wire-based terminal devices. This driving has to be converted by the central radio switching assembly into driving for the connected base stations which is suitable for the management of wire-free communications terminal devices. In particular, the central radio switching assembly has to independently control or manage the operations specific to wire-free communication, such as e.g., the operations associated with logging on and off of mobile terminal devices or with a radio cell changeover. The requisite functionality is generally very extensive and corresponding central radio switching assemblies are therefore comparatively costly.

SUMMARY OF THE INVENTION

It is accordingly an object of the invention to provide a method which overcomes the above-mentioned disadvantageous of the prior art methods of this general type and which enables requested connections to mobile terminal devices to be set up via the respectively responsible base station without a central radio switching assembly.

As a result of a mobile terminal device logging on at one of a plurality of base stations coupled to a switching device, the switching device is configured in such a way that a connection to the mobile terminal device is set up via the relevant base station in the event of a subsequent connection request directed to the same mobile terminal device. If the base station is coupled to the switching device, not directly, but via at least one interposed base station, the switching device is configured in such a way that a connection is set up via interposed base stations and the base station at which the mobile terminal device is currently logged on in the event of a subsequent connection request directed to the mobile terminal device. In this case, the configuration of the switching device is essentially controlled by the respective base stations via which a mobile terminal device is to be coupled to the switching device, i.e. in a decentralized manner.

In cases in which no interposed base stations are provided and in the context of terminal equipment logging-on, the base station communicates the terminal equipment identifier and also a control information item to the switching device. This can be effected using a standardized protocol, e.g. in accordance with the ETSI standard definition for signaling QSIG for private networks or DSS1 for public networks.

If, by contrast, the base station is coupled to the switching device via at least one interposed base station, the terminal equipment identifier is passed on, in the context of logging on, as far as that interposed base station which is directly connected to the switching device. The directly connected base station communicates, to the switching device, the terminal equipment identifier and also a control information item.

In both cases mentioned above, the control information item activates a forwarding performance feature, known per se in connection with wire-based terminal equipment, in the switching device. The terminal equipment identifier that was likewise communicated is included as a parameter. The forwarding performance feature initiates, in the event of connection requests directed to the relevant mobile terminal device, a connection setup routed via the directly connected base station as far as the mobile terminal device—via interposed base stations in the second case.

Through the utilization of a forwarding performance feature which is known per se in connection with wire-based terminal equipment, switching devices which are designed for wire-based communication can also be used unchanged, and thus cost-effectively, for the realization of a method according to the invention. Likewise, there is no need for alterations to mobile terminal devices in order to carry out a method according to the invention, so that existing terminal devices can continue to be used. In order to implement the control functions which are required for realizing a method according to the invention, it is necessary merely for the base stations to be slightly modified.

In accordance with another feature of the invention, the method can be realized using air interfaces in accordance with different standards between mobile terminal devices and base stations. It is also possible for a number of standards to be combined. Advantageous embodiments result, in particular, in using air interfaces in accordance with the ETSI standard definitions DECT (Digital Enhanced Cordless Telecommunications), DCS (Digital Cellular System) or GSM (Global System for Mobile Communication) or an air interface in accordance with the UMTS definition (Universal Mobile Telecommunication System) proposed for standardization; furthermore using air interfaces in accordance with the ARI standard definition PHS (Personal Handyphone System) is possible.

As the forwarding performance feature to be activated, provision may be made of a performance feature which is standardized for wire-based communication. Such a performance feature can include, for example, a performance feature for call diversion, a performance feature for changing an assignment between the call number of a terminal device and the internal number of a peripheral port, or another performance feature in accordance with the ETSI standard for ISDN. Through the activation of a performance feature for call diversion, for example, calls which arrive for the mobile terminal device can be diverted in a simple manner to the directly connected base station, which then initiates forwarding of the calls to the mobile terminal device. In this case, the switching device has communicated to it the terminal equipment identifier as the call number of the terminal equipment for which arriving calls are to be diverted.

For simple specification of that base station to which the calls are to be diverted, the forwarding performance feature may be activated e.g. in such a way that the calls are in each case diverted to the base station which activates the forwarding performance feature.

If an explicit indication of a diversion destination is necessary when the performance feature is activated, the switching device may also have communicated to it a base station identifier—of the directly connected base station—using which the diversion destination is defined.

In accordance with an added feature of the invention, after the communication of the terminal equipment identifier identifying the mobile terminal device, a base station can check whether the mobile terminal device is authorized to set up connections via the base station. For this purpose, a table with identifiers of terminal devices which are authorized to set up connections is searched for the communicated terminal equipment identifier and the method is continued only when a matching table entry is found. In this way, the communications system can, for example, be protected against unauthorized use.

In accordance with an additional feature of the invention, one base station can transmit data and/or signals to one or more other base stations. By way of example, one base station, in the event of a mobile terminal device logging on, can communicate data relating to this logging-on to another base station. Thus, e.g. the terminal equipment identifier of the logged-on mobile terminal device can be communicated to other base stations in order to automatically log off the mobile terminal device there—if logged on—or in order to check the consistency of this logging-on with the instances of logging-on at other base stations.

Furthermore, one base station can transmit a system identifier of the communications system e.g. a so-called EIC identifier, to one or more other base stations. This makes it possible to ensure that a plurality of base stations can be identified by a mobile terminal device as belonging to a common communications system, thereby simplifying the administration of the communications system in particular during the roaming operation.

In accordance with a further feature of the invention, data and/or signals can be transmitted in a wire-free manner between base stations. The transmitting and receiving devices already present in the base stations may preferably be utilized for the wire-free communication between the base stations. In this case, the transmission protocol used may be the transmission protocol which is provided for the data exchange with the mobile terminal devices. In this way, a base station can be integrated in the communications system in a wire-free manner by being coupled to the switching device via another base station in a wire-free manner. This often requires less installation outlay than a wire-based connection. In such a case, all the signals or data that are to be transmitted to the switching device are first communicated in a wire-free manner to the other base station and, from there, to the switching device. The switching device does not have to be provided with a dedicated air interface for this purpose. A base station via which another base station is coupled to the switching device is often also referred to as a repeater. If the switching device is provided with a suitable air interface, a base station provided therefor can also be integrated in the communications systems in a wire-free manner without a repeater base station.

Other features which are considered as characteristic for the invention are set forth in the appended claims.

Although the invention is illustrated and described herein as embodied in a handover method (roaming) for mobile terminal devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will the best understood from the following description of specific embodiments when read in connection with the accompanying drawings.

DESCRIPTION OF THE PREFERRED EMBODIMENTS

Figure 1:
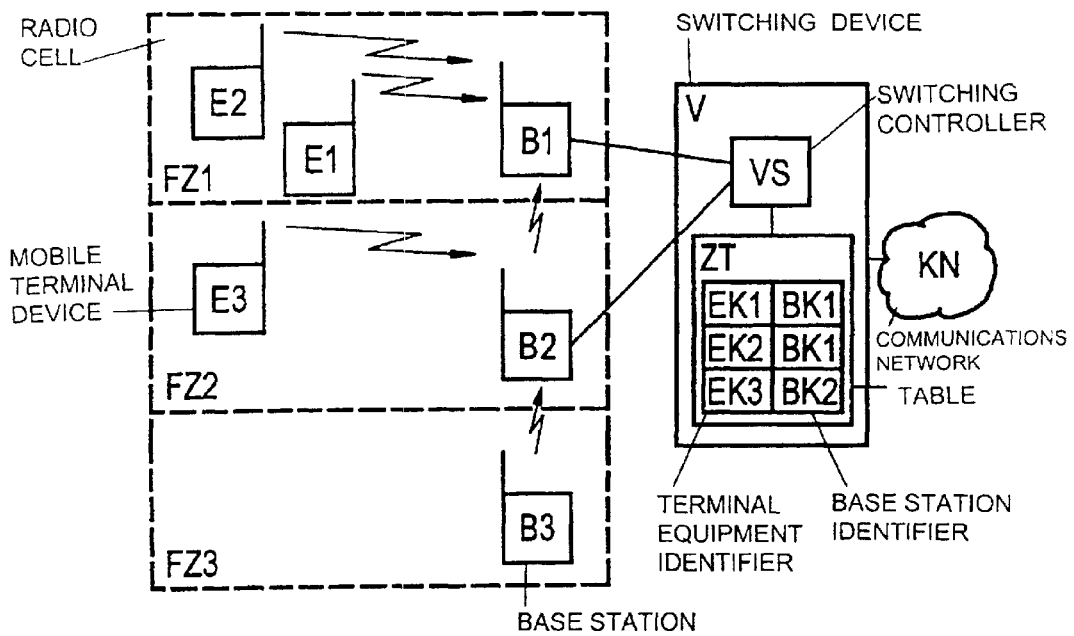
FIG. 1 shows a schematic illustration of a communications system with mobile terminal devices assigned to base stations.
Figure 2:
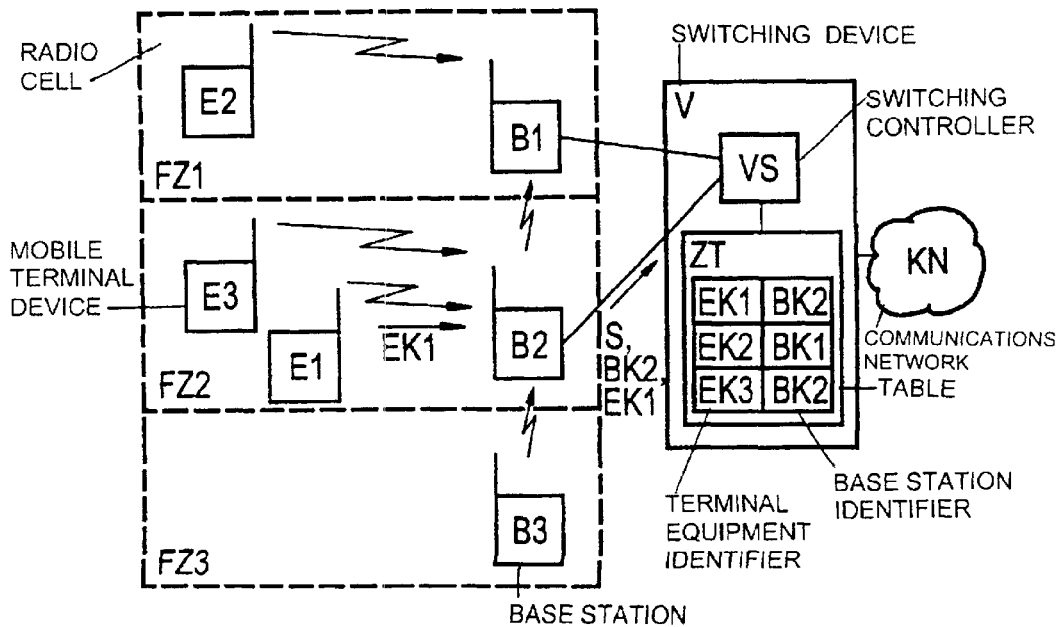
FIG. 2 shows a schematic illustration of the communications system with the mobile terminal devices assigned to the base stations in a different manner.
Figure 3:
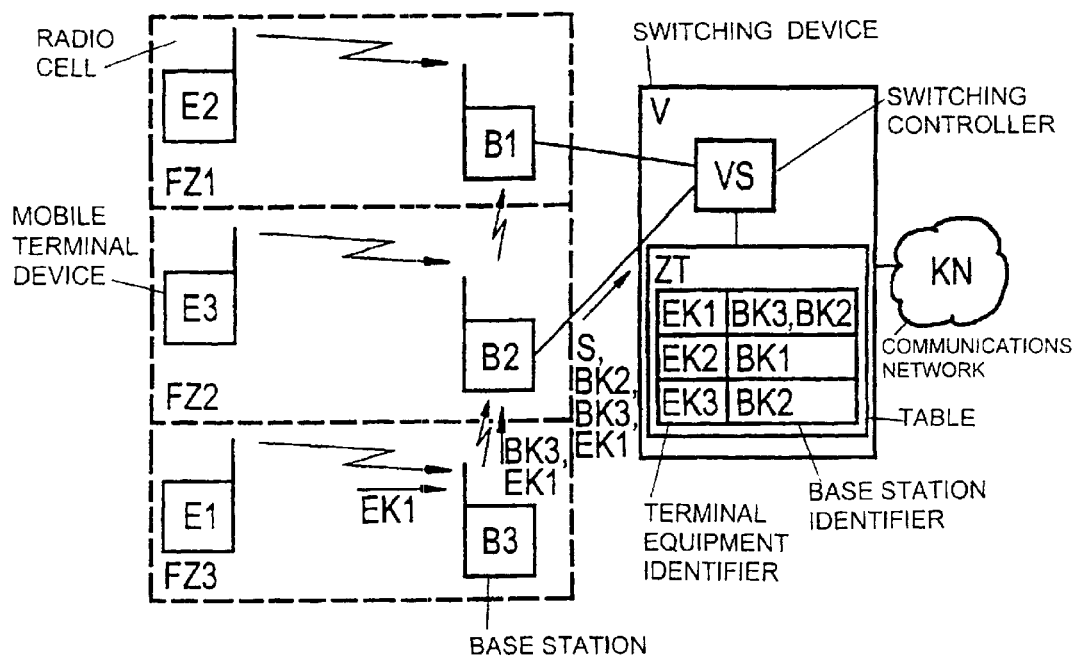
FIG. 3 shows a schematic illustration of the communications system with the mobile terminal devices assigned to the base stations in yet another manner.

FIG. 1 to FIG. 3 each illustrate schematically a communications system including a switching device V coupled to a communications network KN having a switching controller VS, three base stations B1, B2, B3 with associated radio cells FZ1, FZ2, FZ3 and three mobile terminal devices E1, E2, E3 coupled in a wire-free manner, e.g. cordless telephones according to the DECT standard or mobile telephones according to the GSM standard. Whereas the base stations B1 and B2 are connected directly to the switching device V, the base station B3 is coupled to the switching device V in a wire-free manner via the base station B2. The base stations B1 and B2 which are directly connected to the switching device V are also coupled to one another in a wire-free manner, e.g. via a DECT air interface, in order to be able to exchange signals and/or data without a detour via the switching device V or a mobile terminal device. Incidentally, a wire-free coupling is indicated in each case by a stylized flash of lightening. An assignment table ZT is provided in the switching device V, in which table there are stored, for each mobile terminal device E1, E2, E3, a terminal equipment identifier EK1, EK2 or EK3 identifying the latter. Base station identifiers BK1, BK2, BK3 of the base stations B1, B2, B3 are respectively assigned to the terminal equipment identifiers EK1, EK2 or EK3—via which a mobile terminal device can be connected to the switching device V. The-terminal equipment identifiers EK1, EK2 or EK3 of the mobile terminal devices E1, E2, E3 may be the call numbers thereof, for example. In order to realize a method based on the present invention, it suffices to use a cost-effective switching device V which is designed for wire-based communications systems and also has performance features which are only standardized in connection with wire-based communication. An assignment table ZT is generally already contained in switching devices with performance features as are required for implementing the method according to the invention.

The number—illustrated in the drawing—of base stations B1, B2, B3 connected to the switching device V and the number, form and configuration of the radio cells is merely by way of example and is intended to serve to simplify the description.

In FIG. 1, the mobile terminal devices E1 and E2 are situated in the radio cell FZ1 of the base station B1, while the mobile terminal device E3 is situated in the radio cell FZ2 of the base station B2. All the mobile terminal devices E1, E2, E3 are in each case logged on at the base station B1, B2, B3 in whose radio cell FZ1, FZ2, FZ3 they are located, and can thus be connected to the switching device V via the respective base station. In accordance with this configuration, in the assignment table ZT the base station identifiers BK1, BK1 and BK2 are assigned to the terminal equipment identifiers EK1, EK2 and EK3 as follows: BK1 to EK1, BK1 to EK2, and BK2 to EK3.

FIG. 2 shows a state after a changeover of the mobile terminal device E1 to the radio cell FZ2 of the base station B2. In the course of logging on at this base station B2, the mobile terminal device E1 transmits its terminal equipment identifier EK1 to the base station B2 and is registered there as being able to be reached via the base station B2. The base station B2 thereupon communicates to the switching controller VS a control information item S, preferably in accordance with the ETSI standard definition for signaling QSIG for private networks or DSS1 for public networks, a base station identifier BK2 identifying the base station B2, and also the terminal equipment identifier EK1 of the mobile terminal device B1. The control information item S activates a performance feature of the switching device V for call diversion. A performance feature for call diversion is also very common in the field of wire-based communication and is standardized e.g. in accordance with the ETSI standard for ISDN. In the context of such a performance feature, a table—designated here as assignment table ZT—is usually managed in which there is specified for each terminal device for which a call diversion is active, a respective location in the communications system to which connection requests directed to the terminal device are to be forwarded in the context of the call diversion. In this sense, the assignment table ZT is updated, because of the activated performance feature for call diversion, by entering the communicated terminal equipment identifier EK1 of the mobile terminal device E1 as a call number of the terminal equipment for which incoming calls are to be diverted, and by entering the communicated base station identifier BK2 designating the diversion destination in the assignment table ZT, in a manner assigned to one another. As a result, a connection request directed to the mobile terminal device E1 is passed on from the switching device V, after searching for the terminal equipment identifier EK1 of the mobile terminal device in the assignment table ZT, in a targeted manner to the base station B2 identified by the assigned base station identifier BK2, and a connection setup is initiated via the base station B2 to the mobile terminal device E1.

Finally, FIG. 3 shows a state after a changeover of the mobile terminal device E1 to the radio cell FZ3 of the base station B3, which is coupled to the switching device V in a wire-free manner via the base station B2. In the course of logging on at this base station B3, the mobile terminal device E1 transmits its terminal equipment identifier EK1 to the base station B3 and is registered there as being able to be reached via the base station. The base station P3 thereupon transmits the terminal equipment identifier EK1 and also a base station identifier BK3, identifying the base station B3, to the base station B2 which is directly connected to the switching device V. This base station B2 combines the communicated base station identifier BK3 and the base station identifier BK2 identifying the base station B2 to form a path information item (BK3, BK2) describing the route from the switching device V to the base station B3. The base station B2 thereupon communicates to the switching controller VS the control information item S, the terminal equipment identifier EK1 and also the path information item (BK3, BK2). Once again—as described above—the control information item S activates a performance feature of the switching device V for call diversion. In this case, the communicated terminal equipment identifier EK1 and the communicated path information item (BK3, BK2) are entered in the assignment table ZT, in a manner assigned to one another. As a result, in the event of a connection request directed to the mobile terminal device E1, from the switching device V, after searching for the terminal equipment identifier EK1 of the mobile terminal device in the assignment table ZT, a connection can be set up in a targeted manner via the route described by the assigned path information item (BK3, BK2) i.e. via the base stations B2 and B3, to the mobile terminal device E1.

I claim:

1. A method for controlling a switching device that can be used to establish wire-free connections with mobile terminal devices through coupled base stations, which comprises:

when a mobile terminal device logs on at a base station, communicating a terminal equipment identifier from the mobile terminal device to the base station that identifies the mobile terminal device to the base station;

communicating, from the base station to a switching device, the terminal equipment identifier and a control information item for activating a forwarding feature in the switching device; and if a connection request is directed to the mobile terminal device, initiating a connection setup to be routed through the base station as a result of the communication.

2. The method according to claim 1, wherein the base station transmits a base station identifier identifying the base station to the switching device such that if a connection request is directed to the mobile terminal device the connection setup will be routed through the base station.

3. A method for controlling a switching device that can be used to establish wire-free connections with mobile terminal devices through coupled base stations, which comprises:

when a mobile terminal device logs on at a first base station that is coupled to a switching device through at least one interposed base station, communicating a terminal equipment identifier from the mobile terminal device to the first base station that identifies the mobile terminal device to the first base station;

defining a directly connected base station by directly connecting one—at least one interposed base station to the switching device;

passing on the terminal equipment identifier from the first base station to the directly connected base station;

communicating, from the directly connected base station to a switching device, the terminal equipment identifier and a control information item for activating a forwarding feature in the switching device; and if a connection request is directed to the mobile terminal device, initiating a connection setup to be routed through the first base station as a result of the communication.

4. The method according to claim 3, which comprises:

communicating information to the directly connected base station about a route of a connection that is to be set up between the directly connected base station and the first base station;

using the information about the route to create a path information item describing the route;

communicating the path information item from the directly connected base station to the switching device; and if a connection request is directed to the mobile terminal device, initiating a connection setup that is to be routed to the first base station using the route described by the path information item, as a result of the communication.

5. The method according to claim 3, which comprises transmitting a base station identifier from the directly connected base station to the switching device for specifying a base station through which the connection setup is to be routed in the event of a connection request directed to the mobile terminal device.

6. The method according to claim 3, wherein the forwarding feature to be activated is a feature for call diversion.

7. The method according to claim 3, wherein the forwarding feature to be activated is a feature for changing an assignment between a call number of a the mobile terminal device and an internal number of a peripheral port of the switching device.

8. The method according to claim 3, which comprises after communicating the terminal equipment identifier, using a base station that processes a table having terminal equipment identifiers of approved terminal devices to check whether the mobile terminal device is authorized to set up connections through the base station; and continuing with the connection only if a result of the check establishes that the mobile terminal device is authorized.

9. The method according to claim 3, which comprises transmitting from one base station to another base station, data relating to the logging-on of the mobile terminal device.

10. The method according to claim 3, which comprises transmitting from one base station to another base station, data relating to an authorization of the mobile terminal device to set up connections.

11. The method according to claim 3, which comprises transmitting from one base station to another base station, a system identifier of a communications system.

12. The method according to claim 3, which comprises transmitting data and/or signals in a wire-free manner between base stations.

13. The method according to claim 3, which comprises transmitting data and/or signals in a wire-free manner between a base station and the switching device.

* * * * *